United States Patent
Ando et al.

(10) Patent No.: US 6,281,273 B1
(45) Date of Patent: Aug. 28, 2001

(54) METHOD OF PREPARING HEATING TYPE PAVING MATERIAL AS WELL AS COMPOSITION FOR HEATING TYPE PAVING MATERIAL TO BE USED FOR THE METHOD

(75) Inventors: Seitaro Ando, Tokyo; Tadao Goto; Sadao Hagiwara, both of Chiba; Haruyoshi Miyauchi, Yotsukaido, all of (JP)

(73) Assignee: Toho Chemical Industry Co., Ltd., Tokyo (JP)

( * ) Notice: Subject to any disclaimer, the term of this patent is extended or adjusted under 35 U.S.C. 154(b) by 0 days.

(21) Appl. No.: 09/597,096

(22) Filed: Jun. 20, 2000

(30) Foreign Application Priority Data

Jun. 24, 1999 (JP) .................................................. 11-214103

(51) Int. Cl.$^7$ ................................ C08K 3/04; C08K 5/16
(52) U.S. Cl. ............................................. 524/68; 524/198
(58) Field of Search ........................................ 524/198, 68

(56) References Cited

U.S. PATENT DOCUMENTS

| 4,985,079 | * | 1/1991 | Graf et al. ......................... 252/311.5 |
| 5,017,230 | * | 5/1991 | Hopkins et al. .................. 106/284.3 |
| 5,160,453 | * | 11/1992 | Schilling ............................ 252/311.5 |

FOREIGN PATENT DOCUMENTS

| A-55-38993 | 3/1980 | (JP) . |
| A-55-38995 | 3/1980 | (JP) . |
| A-57-51745 | 3/1982 | (JP) . |

\* cited by examiner

*Primary Examiner*—Kriellion A. Sanders
(74) *Attorney, Agent, or Firm*—Oliff & Berridge, PLC

(57) ABSTRACT

A composition which is a blend of a specified condensate obtained by reacting polyalkylenepolyamine with an fatty acid and a modified polyolefin resin having carboxyl groups at a specified proportion. In preparing the heating type paving material comprising various aggregates, bitumen as base and the composition, the composition is added to bitumen in an amount of 0.05–5.0 weight %. The heating type paving material obtained has superior in peel resistant effect between bitumen and aggregates.

12 Claims, No Drawings

METHOD OF PREPARING HEATING TYPE PAVING MATERIAL AS WELL AS COMPOSITION FOR HEATING TYPE PAVING MATERIAL TO BE USED FOR THE METHOD

BACKGROUND OF THE INVENTION

1. Field of the Invention

The present invention relates to a method of preparing heating type paving material as well as a composition for heating type paving material to be used for the method. The present invention also relates to a heating type paving material which contains said composition and which is particularly superior peeling resistance between aggregates and bitumen.

2. Description of the Related Art

Bitumen such as asphalt, tar and pitch has been hitherto blended with various aggregates and used in road paving materials and waterproof materials.

Bitumen is, however, incompatible with aggregates, thus it has a property to be peeled off easily from aggregates, which causes such a phenomenon that bitumen is peeled off by an action of water such as rain water.

This phenomenon effects adversely on durability of road paving materials such as asphalt pavement, accompanied with effects of heavy duty transportation vehicles.

In order to solve such problems, for example, there have been proposed a process for adding compounds comprising alkylhydroxyamine to bitumen in Japanese Patent Publication No. Sho 55-38993, a process for using higher aliphatic polyamines and their derivatives in Japanese Examined Patent Publication No. Sho 55-38995, and a process for adding silane compounds to bitumen in Japanese Examined Patent Publication No. Sho 57-51745.

However, any of the conventionally proposed processes is insufficient in its effect, thus there is not yet obtained any practically satisfied bitumen having superior peeling resistance from aggregates under the existing state.

SUMMARY OF THE INVENTION

In view of the above, it is one object of the present invention to provide a new method of preparing a heating type paving material. It is another object of the present invention to provide a composition for heating type paving material to be used for the method. It is further another object of the present invention to provide a heating type paving material (particularly, asphalt paving material) which contains said composition and which has superior peeling resistance between aggregates and bitumen.

The inventors of the present invention have made an intensive study in order to solve the above-mentioned problems, and found an extremely superior additive (present composition) for a peeling resistance effect between bitumen and aggregate. Thus, the present invention has been attained with this finding.

That is, the invention provides a method of preparing a heating type paving material containing various aggregates and bitumen as bases, characterized in that a composition which is a blend of (B) a condensate obtained by reacting 1 mole of polyalkylenepolyamine expressed by the following general formula (A)

$$H_2N[(CH_2)_mNH]_n(CH_2)_mNH_2 \quad (A)$$

wherein, m denotes an integer of 2 or 3, and n denotes an integer of 1–8, with from 1 mole to (n+1) moles of a saturated or unsaturated fatty acid having 8–22 carbon atoms and (C) a modified polyolefin resin having carboxyl groups with an acid value of 5–100 in a proportion of (B):(C) ≈95:5–5:95 (weight %) is added to bitumen in an amount of 0.05–5.0 weight %.

The invention also provides a composition for heating type paving material, which is a blend of (B) a condensate obtained by reacting 1 mole of polyalkylenepolyamine expressed by the following general formula (A)

$$H_2N[(CH_2)_mNH]_n(CH_2)_mNH_2 \quad (A)$$

wherein, m denotes an integer of 2 or 3, and n denotes an integer of 1–8, with from 1 mole to (n+1) moles of a saturated or unsaturated fatty acid having 8–22 carbon atoms and (C) a modified polyolefin resin having carboxyl groups with an acid value of 5–100 in a proportion of (B):(C)= 95:5–5.95 (weight %).

Further, the invention provides a heating type paving material comprising (i) various aggregates, (ii) bitumen as bases, and (iii) a composition which is a blend of (B) a condensate obtained by reacting 1 mole of polyalkylenepolyamine expressed by the following general formula (A)

$$H_2N[(CH_2)_mNH]_n(CH_2)_mNH_2 \quad (A)$$

wherein, m denotes an integer of 2 or 3, and n denotes an integer of 1–8, with from 1 mole to (n+1) moles of a saturated or unsaturated fatty acid having 8–22 carbon atoms and (C) a modified polyolefin resin having carboxyl groups with an acid value of 5–100 in a proportion of (B):(C)= 95:5–5:95 (weight %), wherein, the composition is added to bitumen in an amount of 0.05–5.0 weight %.

DETAILED DESCRIPTION OF THE INVENTION

The invention will be described in detail as follows.

It is essential that n is within a range of 1–8 in polyalkylenepolyamines expressed by the above-mentioned general formula (A)

$$H_2N[(CH_2)_mNH]_n(CH_2)_mNH_2 \quad (A).$$

There may be exemplified polyethylenepolyamines such as diethylenetriamine, triethylenetetramine, tetraethylenepentamine, pentaethylenehexamine and octaetylenenonamine; dipropylenetriamine, tripropylenetetramine, tetrapropylenepentamine and pentapropylenehexamine, wherein n is most preferably 4–6 from the viewpoint of effects.

As saturated or unsaturated fatty acids having 8–22 carbon atoms to be reacted with the above-mentioned polyalkylenepolyamines, any of capric acid, coconut fatty acid, lauric acid, myristic acid, palmitic acid, stearic acid, behenic acid, oleic acid, linolic acid and tall oil fatty acid may be effective, wherein saturated or unsaturated fatty acids having 16–18 carbon atoms such as palmitic acid, stearic acid, oleic acid and linolic acid are most preferable from the viewpoint of effects.

Further, from 1 mole to (n+1) moles of the saturated or unsaturated fatty acid having 8–22 carbon atoms is reacted with 1 mole of the above-mentioned polyalkylenepolyamine, wherein it is effective that 1–2 mole(s) of the fatty acid is reacted with 1 mole of polyalkylenepolyamine for the case of n being 1–3 in the polyalkylenepolyamine, that 2–3 moles of the fatty acid is reacted with 1 mole of polyalkylenepolyamine for the case of n being 4–6 in the polyalkylenepolyamine, and that 2–4 moles of the fatty acid is reacted with 1 mole of polyalkylenepolyamine for the case of n being 7–8 in the polyalkylenepolyamine.

Further, as modified polyolefin resins having carboxyl groups having an acid number of 5–100 to be used in the invention, there maybe examplified oxidized polyethylene wax, oxidized polypropylene wax, ethylene-acrylic acid copolymer, ethylene-methacrylic acid copolymer, ethylene-maleic acid (anhydride) copolymer, propylene-maleic acid (anhydride) copolymer, ethylene-itaconic acid (anhydride) copolymer and mixtures of two or more these resins, wherein it is preferable that the acid value thereof is within a range of 5–100 mg KOH/g. It is particularly preferable for a peeling resistance-effect that the acid value is 20–50 mg KOH/g, and it is most preferable that the modified polyolefin resins are oxidized polyethylene wax and oxidized polypropylene wax.

Further, for the composition according to the invention of (B) a condensate obtained by reacting 1 mole of the above-mentioned polyalkylenepolyamine with from 1 mole to (n+1) moles of a saturated or unsaturated fatty acid having 8–22 carbon atoms and (C) a modified polyolefin resin having carboxyl groups with an acid value of 5–100, it is essential that the blending proportion is (B):(C)=95:5–5:95 (weight %). It is particularly effective that the blending proportion is (B):(C)≈80:20–40:60 (weight %).

The composition according to the invention can be obtained easily by condensing (dehydrating) the above-mentioned polyalkylenepolyamine with the higher fatty acid in the presence of an alkali catalyst such as caustic soda and caustic potash by a known method to obtain condensed polyalkylenepolyamine fatty acid amide or condensed alkyl/alkenyl imidazoline compound, and thereafter mixing it with the modified polyolefin resin having carboxyl groups with heating.

Thus, the obtained composition according to the invention can provide extremely superior peeling resistance between bitumen and aggregates.

That is, an object of the invention is to blend and use the above-mentioned specified condensate (B) with the modified polyolefin resin (C) having carboxyl groups with an acid value of 5–100 in the specified proportion, which constitutes a basis of the invention.

Since such proposal has not hitherto been made, it must be said as an extremely important finding.

Although the reason why the composition according to the invention is superior in a peeling resistance-effect between aggregates and bitumen has not been completely clarified theoretically, it is analogized that an ionic bonding between basic amino groups in the above-mentioned condensate (B). and acidic carboxyl groups in the modified polyolefin resin (C) is interacted complicatedly with an ionic property of the aggregate surface to exert effects.

An amount of the composition according to the invention added is 0.05–5.0 weight %, preferably 0.3–3.0 weight % of the heated bitumen.

The use of more than 5.0 weight % has an equal effect but it is disadvantageous economically.

Further, an adding (mixing) method of the composition according to the invention to bitumen may be any method such as to add and agitate it to asphalt heated and molten at 100–250° C. or to prepare beforehand modified bitumen and thereafter to add the composition according to the invention in the case of modified bitumen used.

The invention is then illustrated by the Examples, but the invention is not limited by the following Examples unless exceeding the spirit of the invention.

EXAMPLES

1. Synthetic Examples of a Composition According to the Invention 1.1. Synthesis of a Composition (1) According to the Invention 560 g (2 moles) of oleic acid and 241 g (1 mole) of pentaethylenehexamine were introduced in a four-necked flask, the temperature thereof was gradually increased with introducing nitrogen and dehydrating reaction was carried out for 3 hours at 180° C., by which dioleic amide of pentaethylenehexamine was obtained. Then, the temperature was increased to 240° C., and dehydration reaction was carried out for 5 hours at the same temperature, to synthesize a di-heptadecenylimidazoline compound which is an imidazoline compound.

Then, 50 weight % of oxidized polyethylene wax (softening point of 130° C., acid value of 30, molecular weight of 4,000) was added to 50 weight % of the obtained di-heptadecenylimidazoline compound, mixed at 160° C. for 30 minutes, and cooled, to obtain a composition (1) according to the invention as light yellowish brown flakes.

1.2. Synthesis of Compositions (2) to (8) According to the Invention

Similar to the above synthetic example of the composition (1) according to the invention, compositions (2) to (8) according to the invention described in Table 1 below were prepared.

TABLE 1

Compositions (2)–(8) according to the invention

1. Composition (2) according to the invention
a composition of 60 weight % of a monoamide compound obtained by
the reaction of diethylenetriamine (1 mole) with oleic acid (1
mole) and 40 weight % of oxidized polyethylene wax (molecular weight
of 2,500, softening point of 120° C. acid value of 9)
2. Composition (3) according to the invention
a composition of 70 weight % of a diamide compound obtained by
the reaction of tripropylenetetramine (1 mole) with lauric acid
(2 mole) and 30 weight % of oxidized polyethylene wax (molecular
weight of 3,000, softening point of 100° C., acid value of 20)
3. Composition (4) according to the invention
a composition of 80 weight % of a diamide compound obtained by
the reaction of pentaethylenehexamine (1 mole) with oleic acid
(2 mole) and 20 weight % of oxidized polyethylene wax (molecular
weight of 3,000, softening point of 135° C., acid value of 45)
4. Composition (5) according to the invention
a composition of 95 weight % of a diimidazoline compound obtained
by the reaction of tetraethylenepentamine (1 mole) with stearic
acid (2 mole) and 75 weight % of oxidized polypropylene wax (molecular
weight of 3,000, softening point of 125° C., acid value of 20)
5. Composition (6) according to the invention
a composition of 40 weight % of an imidazoline compound obtained
by the reaction of diethylenetriamine (1 mole) with oleic acid
(1 mole) and 60 weight % of ethylene-acrylic acid copolymer
(molecular weight of 2,500, softening point of 108° C., acid value
of 60)
6. Composition (7) according to the invention
a composition of 25 weight % of a diimidazoline compound obtained
by the reaction of tetrapropylenepentamine (1 mole) with oleic
acid (2 mole) and 75 weight % of oxidized polyethylene wax (molecular
weight of 3,500, softening point of 115° C., acid value of 25)
7. Composition (8) according to the invention
a composition of 5 weight % of a tetraamide compound obtained by
the reaction of heptaethyleneoctamine (1 mole) with oleic acid
(4 mole) and 5 weight % of oxidized polyethylene wax (molecular
weight of 4,500, softening point of 105° C., acid value of 15)

2. Determination of Peeling Resistance-effect 2.1. Method of Determination

In order to confirm the effect of the invention, tests were carried out according to the peeling test method for asphalt films and the static evaluation method about adhesion between crude aggregate and paving petroleum asphalt described in Asphalt Pavement Outline (published by Japan Road Association).

Each 100 g of ANDESITE produced in Aichi prefecture, GRANITE produced in Nagano prefecture and LIMESTONE produced in Ofunato, all of which has a granulate size passing through a 13 mm sieve but remaining on a 9.5 mm sieve, were picked, washed enough, introduced in a 300 ml metallic vessel and dried at 110° C. to a constant weight.

Then, they were introduced in a thermostat drier maintained previously at 150° C. and heated for 1 hour, to obtain crushed stones for testing.

On the other hand, the composition according to the invention obtained in the above-mentioned synthetic example was added to molten petroleum asphalt (penetration degree of 60–80), mixed and thereafter heated for a specified period (24 hours and 144 hours) in a thermostat drier at 180° C.

Then, 5.5 g of the heat-treated material was added to the crushed stones obtained above and stirred vigorously in such a way that crushed stone surfaces were covered completely with asphalt, to prepare a sample for evaluating a peeling resistance.

After the prepared sample was dipped in a thermostat water tank maintained at 80° C. for 30 minutes, it was removed from the water tank and immediately cooled with tap water.

Then, the peeling state was observed about the asphalt film of the sample after dipping treatment individually with referring to sample photographs of peeled area percentages every 5%.

The peeled area percentages are expressed after rounding the average of peeled area percentages in 20 samples observed macroscopically to the nearest whole number (with the proviso that thin translucent part being regarded as non-filmed).

2.2. Result of Determination (Examples 1–13)

Results of Examples 1–13 were obtained by determining peeled area percentages according to the above-mentioned determination method for peeling resistance-effect about the cases of adding the compositions (1)–(8) according to the invention.

The results are described in Table 2 below, wherein the asphalt compositions into which the compositions according to the invention were added were scarcely peeled off from the aggregates.

TABLE 2

Evaluation results of peeling resistant effect

| | | Amount of additive wt. % | Peeled area after heated for a specified period (%) | | | | | |
|---|---|---|---|---|---|---|---|---|
| | | | Andesite | | Granite | | Limestone | |
| | Additive | | 24 h | 144 h | 24 h | 144 h | 24 h | 144 h |
| With Additive | | | | | | | | |
| Example 1 | Composition (1) of the invention | 0.05 | 5 | 5 | 0 | 5 | 5 | 10 |
| Example 2 | Composition (1) of the invention | 0.3 | 0 | 0 | 0 | 0 | 0 | 5 |
| Example 3 | Composition (2) of the invention | 0.2 | 0 | 5 | 0 | 5 | 0 | 5 |
| Example 4 | Composition (2) of the invention | 0.3 | 0 | 0 | 0 | 5 | 0 | 5 |
| Example 5 | Composition (3) of the invention | 0.3 | 0 | 5 | 0 | 0 | 0 | 5 |
| Example 6 | Composition (3) of the invention | 1.0 | 0 | 0 | 0 | 0 | 0 | 0 |
| Example 7 | Composition (4) of the invention | 0.3 | 0 | 5 | 0 | 5 | 0 | 0 |
| Example 8 | Composition (4) of the invention | 3.0 | 0 | 0 | 0 | 0 | 0 | 0 |
| Example 9 | Composition (5) of the invention | 0.3 | 0 | 5 | 0 | 5 | 0 | 5 |
| Example 10 | Composition (5) of the invention | 5.0 | 0 | 0 | 0 | 0 | 0 | 0 |
| Example 11 | Composition (6) of the invention | 0.3 | 0 | 0 | 0 | 0 | 0 | 0 |
| Example 12 | Composition (7) of the invention | 0.5 | 0 | 0 | 0 | 0 | 0 | 0 |
| Example 13 | Composition (8) of the invention | 0.3 | 0 | 5 | 0 | 5 | 0 | 5 |
| Without Additive | | | | | | | | |
| Comparative example 1 | Comparative Compound (1) | 0.5 | 60 | 55 | 55 | 55 | 50 | 50 |
| Comparative example 2 | Comparative Compound (1) | 1.0 | 35 | 50 | 30 | 35 | 30 | 40 |
| Comparative example 3 | Comparative Compound (1) | 1.0 | 40 | 50 | 35 | 45 | 40 | 45 |
| Comparative example 4 | Comparative Compound (2) | 1.0 | 20 | 25 | 15 | 20 | 10 | 20 |
| Comparative example 5 | Comparative Compound (3) | 2.0 | 10 | 25 | 15 | 25 | 10 | 20 |

TABLE 2-continued

Evaluation results of peeling resistant effect

Amount of Peeled area after heated for a specified period (%)

| | Additive | additive wt. % | Andesite 24 h | Andesite 144 h | Granite 24 h | Granite 144 h | Limestone 24 h | Limestone 144 h |
|---|---|---|---|---|---|---|---|---|
| Comparative example 6 | Comparative Compound (2) | 3.0 | 5 | 25 | 10 | 15 | 10 | 25 |
| Comparative example 7 | Comparative Compound (2) | 5.0 | 5 | 20 | 10 | 20 | 15 | 20 |
| Comparative example 8 | Without additive | 0 | 70 | 70 | 65 | 65 | 55 | 60 |

3. Comparative Examples 1–8

Comparative compounds and comparative composition were prepared as described in Table 3 below, and then results of Comparative Examples 1–8 were obtained by determining peeled area percentages of the samples similar to Examples for the cases of adding the comparative compounds and comparative compositions and the cases without additive. The results are shown in Table 2 above.

TABLE 3

Comparative compounds and comparative compositions

1. Comparative compound (1)
a diimidazoline compound obtained by the reaction of pentaethylenehexamine (1 mole) with oleic acid (2 mole)
2. Comparative composition (1)
a composition of 50 weight % of a diimidazoline compound obtained by the reaction of pentaethylenehexamine (1 mole) with oleic acid (2 mole) and 50 weight % of polypropylene wax (molecular weight of 2,000, softening point of 110° C., acid value of 0)
3. Comparative composition (2)
a composition of 50 weight % of an imidazoline compound obtained by the reaction of ethylenediamine (1 mole) with oleic acid (1 mole) and 50 weight % of oxidizedpolyethylene wax (molecular weight of 1,300, softening point of 125° C., acid value of 20)
4. Comparative composition (3)
a composition of 97 weight % of a diamide compound obtained by the reaction of tetraethylenpentamine (1 mole) with lauric acid (2 mole) and 3 weight % of oxidized polyethylene wax (molecular weight of 2,500, softening point of 108° C., acid value of 60)
5. Comparative compound (2)
a neutralized compound of beef tallow alkyl propylene diamine (1 mole) and hydrochloric acid (2 mole)
6. Comparative compound (3)
oxidized polyethylene wax (molecular weight of 2,500, softening point of 110° C., acid value of 8)

An extremely superior peeling resistance between bitumen and aggregates can be exhibited by adding a composition according to the invention (for example, the compositions (1)–(8) such as shown in Table 1 above) in an amount 0.05–5.0 weight % of bitumen, by which a heating type paving material according to the invention without any peeling of the aggregates from bitumen can be provided.

What is claimed is:

1. A method of preparing a heating type paving material containing various aggregates and bitumen as bases, characterized in that a composition which is a blend of (B) a condensate obtained by reacting 1 mole of polyalkylenepolyamine expressed by the following general formula (A)

$$H_2N[(CH_2)_mNH]_n(CH_2)_mNH_2 \quad \quad (A)$$

wherein, m denotes an integer of 2 or 3, and n denotes an integer of 1–8, with from 1 mole to (n+1) moles of a saturated or unsaturated fatty acid having 8–22 carbon atoms and (C) a modified polyolefin resin having carboxyl groups with an acid value of 5–100 in a proportion of (B):(C)= 95:5–5:95 (weight %) is added to bitumen in an amount of 0.05–5.0 weight %.

2. A method of preparing a heating type paving material claimed in claim 1, the polyalkylenepolyamine is a polyethylenepolyamine such as diethylenetriamine, triethylenetetramine, tetraethylenepentamine, pentaethylenehexamine and octaethylenenonamine; dipropylenetriamine, tripropylenetetramine, tetrapropylenepentamine or pentapropylenehexamine.

3. A method of preparing a heating type paving material claimed in claim 1, the saturated or unsaturated fatty acid is a capric acid, coconut fatty acid, lauric acid, myristic acid, palmitic acid, stearic acid, behenic acid, oleic acid, linolic acid or tall oil fatty acid.

4. A method of preparing a heating type paving material claimed in claim 1, the modified polyolefin resin is a oxidized polyethylene wax, oxidized polypropylene wax, ethylene-acrylic acid copolymer, ethylene-methacrylic acid copolymer, ethylene-maleic acid (anhydride) copolymer, propylene-maleic acid (anhydride) copolymer, ethylene-itaconic acid (anhydride) copolymer or mixtures of two or more these resins.

5. A composition for heating type paving material which is a blend of (B) a condensate obtained by reacting 1 mole of polyalkylenepolyamine expressed by the following general formula (A)

$$H_2N[(CH_2)_mNH]_n(CH_2)_mNH_2 \quad \quad (A)$$

wherein, m denotes an integer of 2 or 3, and n denotes an integer of 1–8, with from 1 mole to (n+1) moles of a saturated or unsaturated fatty acid having 8–22 carbon atoms and (C) a modified polyolefin resin having carboxyl groups with an acid value of 5–100 in a proportion of (B):(C)= 95:5–5:95 (weight %).

6. A composition for heating type paving material claimed in claim 5, the polyalkylenepolyamine is a polyethylenepolyamine such as diethylenetriamine, triethylenetetramine, tetraethylenepentamine, pentaethylenehexamine and octaetylenanonamine dipropylenetriamine, tripropylenetetramine, tetrapropylenepentamine or pentapropylenehexamine.

7. A composition for heating type paving material claimed in claim 5, the saturated or unsaturated fatty acid is a capric acid, coconut fatty acid, lauric acid, myristic acid, palmitic acid, stearic acid, behenic acid, oleic acid, linolic acid or tall oil fatty acid.

8. A composition for heating type paving material claimed in claim 5, the modified polyolefin resin is a oxidized polyethylene wax, oxidized polypropylene wax, ethylene-acrylic acid copolymer, ethylene-methacrylic acid copolymer, ethylene-maleic acid (anhydride) copolymer, propylene-maleic acid (anhydride) copolymer, ethylene-itaconic acid (anhydride) copolymer or mixtures of two or more these resins.

9. A heating type paving material comprising (i) various aggregates, (ii) bitumen as bases, and (iii) a composition which is a blend of (B) a condensate obtained by reacting 1 mole of polyalkylenepolyamine expressed by the following general formula (A)

  (A)

wherein, m denotes an integer of 2 or 3, and n denotes an integer of 1–8, with from 1 mole to (n+1) moles of a saturated or unsaturated fatty acid having 8–22 carbon atoms and (C) a modified polyolefin resin having carboxyl groups with an acid value of 5–100 in a proportion of (B):(C)= 95:5–5:95 (weight %), wherein, the composition is added to bitumen in an amount of 0.05–5.0 weight %.

10. A heating type paving material claimed in claim 9, the polyalkylenepolyamine is a polyethylenepolyamine such as diethylenetriamine, triethylenetetramine, tetraethylenepentamine, pentaethylenehexamine and octaetylenenonamine; dipropylenetriamine, tripropylenetetramine, tetrapropylenepentamine or pentapropylenehexamine.

11. A heating type paving material claimed in claim 9, the saturated or unsaturated fatty acid is a capric acid, coconut fatty acid, lauric acid, myristic acid, palmitic acid, stearic acid, behenic acid, oleic acid, linolic acid or tall oil fatty acid.

12. A heating type paving material claimed in claim 9, the modified polyolefin resin is a oxidized polyethylene wax, oxidized polypropylene wax, ethylene-acrylic acid copolymer, ethylene-methacrylic acid copolymer, ethylene-maleic acid (anhydride) copolymer, propylene-maleic acid (anhydride) copolymer, ethylene-itaconic acid (anhydride) copolymer or mixtures of two or more these resins.

* * * * *